United States Patent
Senner et al.

(10) Patent No.: US 8,389,168 B2
(45) Date of Patent: Mar. 5, 2013

(54) INJECTOR CONTROL FOR FUEL CELL SYSTEM

(75) Inventors: Ralf Senner, Wiesbaden (DE); Daniel C Di Fiore, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 504 days.

(21) Appl. No.: 12/635,429

(22) Filed: Dec. 10, 2009

(65) Prior Publication Data

US 2011/0143234 A1 Jun. 16, 2011

(51) Int. Cl.
*H01M 8/04* (2006.01)
(52) U.S. Cl. .......................... 429/415; 429/431; 429/444
(58) Field of Classification Search .......................... None
See application file for complete search history.

(56) References Cited

U.S. PATENT DOCUMENTS

| 7,910,257 B2 * | 3/2011 | Katano .......................... 429/444 |
| 2006/0024548 A1 | 2/2006 | Pechtold et al. |
| 2009/0130510 A1 * | 5/2009 | Ishikawa et al. ................ 429/23 |

FOREIGN PATENT DOCUMENTS

WO    WO 2008/072643    *    6/2008

* cited by examiner

*Primary Examiner* — Jonathan Crepeau
(74) *Attorney, Agent, or Firm* — John A. Miller; Miller IP Group, PLC

(57) ABSTRACT

A fuel cell system that employs an injector/ejector for providing fresh hydrogen and anode recirculation gas to the anode side of a fuel cell stack. The injector/ejector is operated with a variable frequency so that the injector open time at low stack current densities is long enough to allow a pressure drop to be provided in the anode flow channels to push out water that may have accumulated therein. In one embodiment, the injector/ejector control provides a minimum pulse width per cycle and a maximum frequency so that as the stack current density decreases below a certain value the frequency decreases from the maximum frequency to maintain the pulse width constant at the minimum pulse width.

8 Claims, 3 Drawing Sheets

INJECTOR CONTROL FOR FUEL CELL SYSTEM

BACKGROUND OF THE INVENTION

1. Field of the Invention

This invention relates generally to a system and method for efficiently providing anode recirculation to a fuel cell stack and, more particularly, to a system and method for efficiently providing anode recirculation gas to the anode side of the fuel cell stack using an injector/ejector.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Some fuel cell systems employ anode recirculation where the anode exhaust gas is sent back to the anode input so that the unused hydrogen in the exhaust can be reused. Typically a pump is required in the anode recirculation loop so that the proper pressure and ratio of recirculation gas to fresh hydrogen is provided to the anode input of the stack to provide efficient stack operation. An improper anode flow and pressure to the fuel cell stack could result in a low anode flow rate that may allow water to accumulate in the anode flow channels. Accumulation of water in the anode flow channels may cause anode flow to be diverted to other channels where those channels feeding certain fuel cells in the stack are starved of hydrogen, and may experience a voltage collapse. In one embodiment, it is necessary to provide about half as much recirculation gas as fresh hydrogen being provided to the anode side of the stack. If enough recirculation gas is not provided, then the flow rate may not be high enough to drive out excess water in the anode flow channels. The lower the current density of the stack, the lower the anode flow rate, and thus the more likely the stack will be flooded with water.

An improper anode flow and pressure to the fuel cell stack could also result in a low anode flow rate that may not provide hydrogen gas to each fuel cell in the stack. As mentioned, a typical fuel cell stack may have two hundred or more fuel cells. Tolerances in material properties might cause a higher pressure drop for some of the fuel cells, thus reducing the amount of gas supplied to an individual fuel cell. If enough recirculation gas is not provided, then the flow rate may not be high enough to supply sufficient hydrogen gas to the fuel cells with a higher individual pressure drop.

U.S. Patent Application Publication No. 2006/024548 to Pechtold et al. discloses an injector/ejector for a fuel cell system that injects a combination of anode fuel and anode exhaust into the anode side of a fuel cell stack. The injector/ejector is designed to eliminate the need for a recirculation pump in an anode recirculation system. However, improvements can be made for using an injector/ejector for providing the proper ratio of fresh hydrogen and anode recirculation gas to the anode side of the fuel cell stack for efficient stack operation.

An injector is a pulse device that when the injector is open, the flow of gas is substantially constant, and when the injector is closed, no flow is provided. Typical control of an injector uses a variable duty cycle and a fixed frequency. The duty cycle is the proportion of time the injector is open during one frequency cycle. A typical frequency for injector control in a fuel cell system may be as high as 60 Hz or as low as 15 Hz. A higher frequency is sometimes preferred for a more stable stack pressure control.

Controlling the injector with a fixed frequency causes the injector to be open for only a very short period of time when the fuel cell system is operating at low power. For example, the duty cycle can be as low as 1% at system idle. In this case, the injector is open for less than 1 ms when the injector is operated at a frequency of 15 Hz. Although this is long enough to supply the proper amount of hydrogen for the fuel cell reaction, it may be too short to build up a pressure drop across the anode side of the fuel cell stack to achieve a high enough gas velocity throughout the fuel cell stack. A certain pressure drop is required for uniform flow distribution and a high gas velocity will improve water management.

SUMMARY OF THE INVENTION

In accordance with the teachings of the present invention, a fuel cell system is disclosed that employs an injector/ejector for providing fresh hydrogen and anode recirculation gas to the anode side of a fuel cell stack. The injector/ejector is operated with a variable frequency so that the injector open time at low stack current densities is long enough to allow a pressure drop to be provided in the anode flow channels to push out water that may have accumulated therein. In one embodiment, the injector/ejector control provides a minimum pulse width per cycle and a maximum frequency so that as the stack current density decreases below a certain value the frequency decreases from the maximum frequency to maintain the pulse width constant at the minimum pulse width.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for changing the frequency command to an injector/ejector that provides anode recirculation gas to the anode side of a fuel cell stack is merely exemplary in nature, and is in no way intended to limit the invention or its applications or uses.

Figure 1:
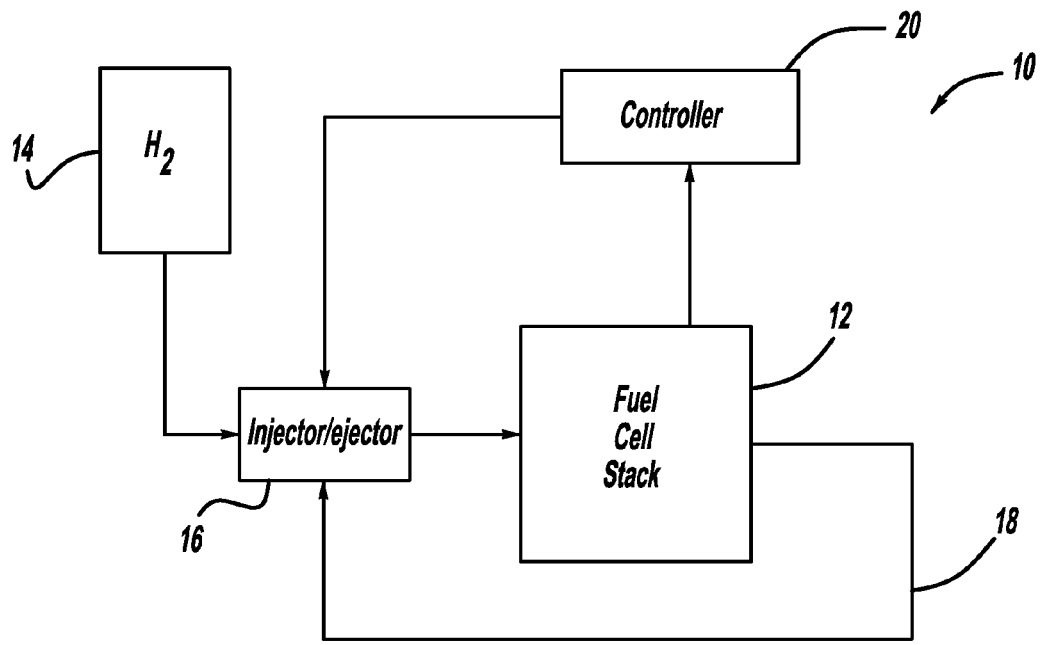
FIG. 1 is a block diagram of a fuel cell system employing an anode recirculation loop and an injector/ejector for injecting fresh hydrogen and recirculated anode exhaust into the anode side of a fuel cell stack.

FIG. 1 is a block diagram of a fuel cell system 10 including a fuel cell stack 12. A hydrogen gas source 14 provides hydrogen gas to the anode side of the fuel cell stack 12 through an injector/ejector 16. Anode exhaust gas is output from the fuel cell stack 12 on anode recirculation line 18 that returns the anode exhaust gas to the injector/ejector 16. As discussed above, the injector/ejector 16 is a known device that has a duty cycle that provides a flow of hydrogen gas from the source 14 when the injector/ejector 16 is open and cuts off the flow of hydrogen gas to the fuel cell stack 12 when the injector/ejector 16 is closed. When the injector/ejector 16 is open, the high flow rate of the fresh hydrogen through an orifice creates a low pressure drop in the injector/ejector 16 that causes the anode recirculation gas to be drawn into the injector/ejector 16 from the line 18. The injector/ejector 16 can be any suitable injector/ejector for the purposes discussed herein, such as that disclosed in the '548 application.

As discussed above, at low stack current densities, only a small amount of hydrogen is required for proper fuel cell stack operation. Therefore, the duty cycle of the injector/ejector 16 is typically reduced as the stack current density is reduced so that it is opened less often. As will be discussed in detail below, the present invention changes the frequency of the injector/ejector 16, generally based on the current density of the fuel cell stack 12, so that at low hydrogen flow demands, the amount of hydrogen provided from the source 14 is low, and proper, but the time that the injector/ejector 16 is open is long enough to drive water out of the anode flow channels of the fuel cell stack 12. In other words, at low stack current densities, the time that the injector/ejector 16 is open is long enough to provide enough anode pressure in the stack 12 to drive out the water, but the frequency that the injector/ejector is opened is less often. Thus, the same amount of hydrogen is provided to the stack for the respective stack current density as was done in the fixed frequency systems.

A controller 20 receives a current density reading from the fuel cell stack 12 and controls the duty cycle of the injector/ejector 16 at the desired frequency as discussed herein.

In one non-limiting embodiment, the pulse width of the command that opens the injector/ejector 16 is based on a fixed minimum pulse width, such as 5 ms. This is accomplished by varying the frequency of the injector pulses to ensure that each on cycle of the injector/ejector 16 is at least 5 ms. The frequency may have a maximum frequency for higher stack current densities where the pulse width is increased to provide the proper amount of hydrogen gas once the maximum frequency is reached. Thus, as the stack current density decreases when the injector/ejector 16 is at the maximum frequency, the pulse width is reduced as the need for hydrogen gas is reduced until the pulse width reaches the minimum pulse width. After that, the frequency of the injector/ejector 16 is reduced so that the proper amount of hydrogen gas is provided for the stack current density, but the on time of the injector/ejector 16 is maintained constant for each cycle of the frequency.

The following equation is used to calculate the injector/ejector 16 pulse width.

$$PW = \frac{DC}{f}$$

Where DC is the duty cycle of the injector/ejector 16 and f if the frequency of the signal provided from the controller 20.

Rearranging equation (1) and solving for the frequency gives:

$$f = \frac{DC}{PW}$$

The reason that frequency is chosen to be varied is because the duty cycle is determined by the stack pressure control algorithm as:

$$DC = f\left(j, \frac{dP_{An}}{dt}, ValvePos\right)$$

The duty cycle is a function of the current density, the change in pressure of the anode side of the stack 12 and the position of other valves in the anode sub-system. This calculation is only used at low stack current density where the frequency to satisfy the 5 ms fixed pulse width is less than 15 Hz. If the result of the calculation is greater than 15 Hz, then the frequency is set to 15 Hz. These values are merely representative in that the above described approach could be used for any suitable maximum frequency and minimum pulse width.

Figure 2:
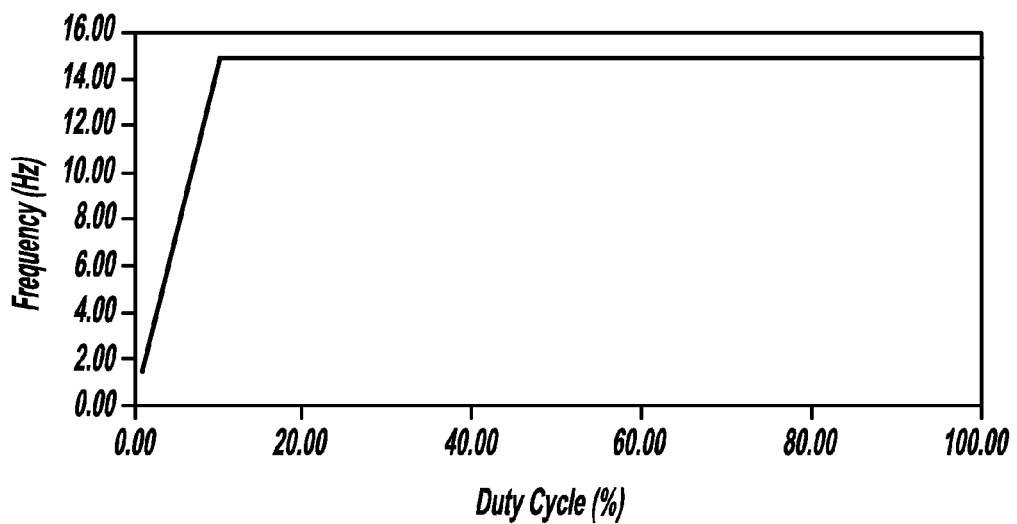
FIG. 2 is a graph with duty cycle on the horizontal axis and frequency on the vertical axis showing a change in the frequency of the injector/ejector shown in FIG. 1 at low stack current densities that is relative to its duty cycle.

FIG. 2 is a graph with duty cycle on the horizontal axis and frequency on the vertical axis showing how the frequency is reduced at a low duty cycle, i.e., stack current density, and that when the duty cycle reaches about 10%, the maximum frequency is reached where only the duty cycle is changed as the current density increases.

Figure 3A:
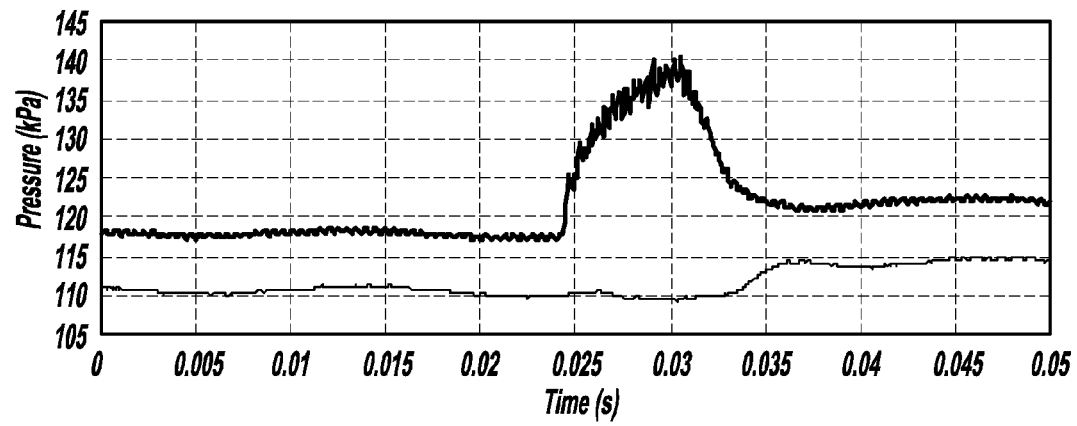
FIGS. 3a and 3b are graphs with time on the horizontal axis and pressure on the vertical axis for a fixed frequency injector/ejector and a fixed pulse width injector/ejector, respectively.
Figure 3B:
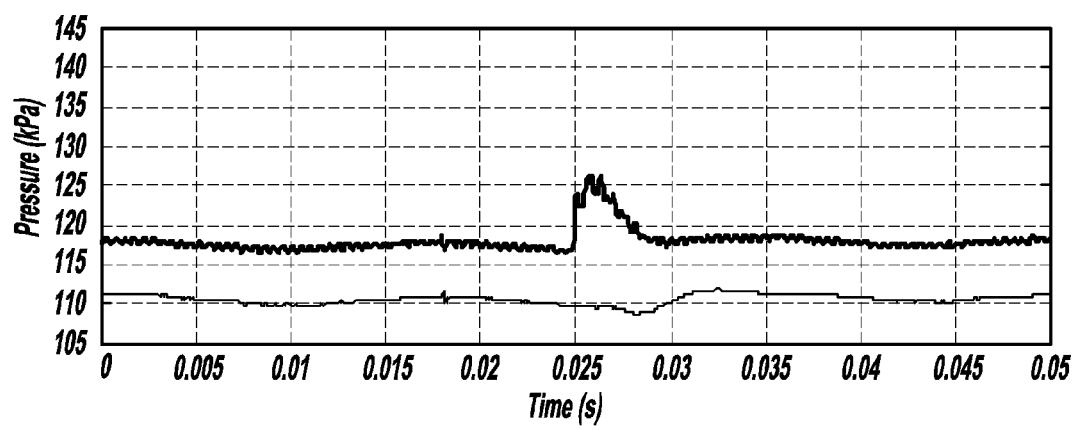

FIGS. 3a and 3b are graphs with time on the horizontal axis and pressure on the vertical axis where the graph 3b is for a fixed frequency of 15 Hz for the injector/ejector 16 at 0.05 A/cm$^2$ and the graph 3a is for a fixed pulse width of the signal for the injector/ejector 16 at the same current density to show that the pressure increases in the anode side of the stack using the fixed pulse width scheme of the invention over the pulse width fixed frequency known in the art. The top line of the two graphs is an anode inlet pressure and the bottom line in the two graphs is the anode outlet pressure. The more flow through the anode flow channels, the higher the pressure across anode flow channels, as shown by the top graph. Thus, more water will be driven out of the anode flow channels and sufficient gas is supplied to every fuel cell within the stack 12.

Figure 4:
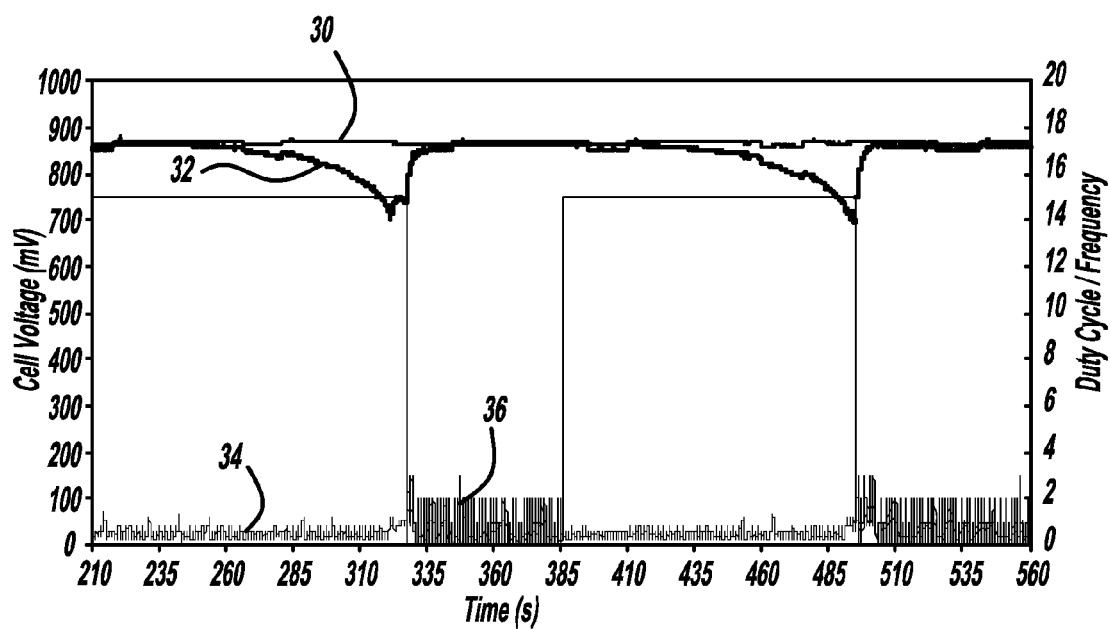
FIG. 4 is a graph with time on the horizontal axis, cell voltage on the left vertical axis and injector/ejector duty cycle/frequency on the right vertical axis showing stack stability with a fixed frequency of 15 Hz and a variable frequency.

FIG. 4 is a graph with time on the horizontal axis, cell voltage on the left vertical axis and duty cycle/frequency of the injector/ejector 16 on the right vertical axis showing advantages of frequency control of the injector/ejector 16. Line 30 is the average cell voltage and line 32 is the minimum cell voltage. Line 34 shows an injector/ejector duty cycle of about 1% for 15 Hz. At this frequency and duty cycle, the minimum cell voltage begins to fall at a certain point. When the controller 20 is switched to the pulse width control shown by line 36, the minimum cell voltage returns to the average showing that stack 12 is more stable using pulse width control of the injector/ejector 16 than with fixed frequency control.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling an injector/ejector that provides a combination of fresh hydrogen and recirculated anode exhaust gas to an anode input of a fuel cell stack, said method comprising:

determining a maximum frequency of a pulsed control signal that controls opening and closing of the injector/ejector;

determining a minimum pulse width of pulses in the control signal controlling when the injector/ejector is open;

determining a duty cycle of the control signal based at least partially on current density of the fuel cell stack, said duty cycle being limited by the minimum pulse width and the maximum frequency; and reducing a frequency of the pulsed control signal to maintain the pulses in the control signal at the minimum pulse width as the duty cycle of the control signal decreases in response to the current density of the stack falling below a certain value.

2. The method according to claim 1 wherein the duty cycle is a function of the stack current density, a change in pressure of the anode side of the fuel cell stack and a position of valves in an anode sub-system.

3. The method according to claim 1 wherein the minimum pulse width is 5 ms.

4. The method according to claim 1 wherein the maximum frequency is 15 Hz.

5. A method for controlling an injector/ejector that provides a combination of fresh hydrogen and recirculated anode exhaust gas to an anode input of a fuel cell stack, said method comprising:

controlling the injector/ejector using a fixed frequency and a changing duty cycle when a stack current density is greater than a predetermined value; and controlling the injector/ejector at a fixed pulse width and a changing frequency that is less than the fixed frequency when the stack current density is below the predetermined value.

6. The method according to claim 5 wherein the duty cycle is a function of stack current density, change in pressure of the anode side of the fuel cell stack and the position of other valves.

7. The method according to claim 5 wherein the fixed pulse width is 5 ms.

8. The method according to claim 5 wherein the fixed frequency is 15 Hz.

* * * * *